Aug. 31, 1965     T. ZAHORODNY     3,203,722
PNEUMATIC BUFFERS FOR MOTOR VEHICLES
Filed Jan. 23, 1963     2 Sheets-Sheet 1

INVENTOR
THEODORE ZAHORODNY
BY
ATTORNEY

Aug. 31, 1965   T. ZAHORODNY   3,203,722
PNEUMATIC BUFFERS FOR MOTOR VEHICLES
Filed Jan. 23, 1963   2 Sheets-Sheet 2

INVENTOR
THEODORE ZAHORODNY
BY *Ralph L Brasett*
ATTORNEY 3,203,722
PNEUMATIC BUFFERS FOR MOTOR VEHICLES
Theodore Zahorodny, 5702 W. Galena St.,
Milwaukee, Wis.
Filed Jan. 23, 1963, Ser. No. 253,442
4 Claims. (Cl. 293—4)

This invention relates to improvements in combined pneumatic and metallic spring buffers for motor vehicles.

One of the objects of this invention is to provide a buffer for attachment to the front or rear of an automobile frame structure which will deaden the shock of collision with the least possible deformation or damage to the vehicle body. Metal bumpers now employed on motor vehicles do not deaden the shock of impact but rather transfer it to the automobile which results in a vehicle body being deformed to a greater or lesser extent, depending upon the velocity of the cars at the time of collision and their masses.

A further object of the invention is to embody in the buffer structure shock absorbing characteristics which will receive the power of the shock of collision to limit or prevent the deformation of the car bodies.

A further object of the invention is to combine two shock absorbing structures in a buffer, the first shock absorbing structure being in the form of a pneumatic body which receives the impact of collision and which pneumatic body transfers to metallic springs the forces of impact not initially absorbed.

More specifically, this invention comprehends the use of a pneumatic impact member mounted on the front or rear frame of an automobile by a plurality of metallic springs, the springs being aligned so that they will receive the forces of impact and absorb such forces to limit or absorb shocks which might injure the car body if uncontrolled as in the instance of a solid buffer.

A still further object of the invention is to include with the buffer structure signal control means whereby the power source of the vehicle is terminated upon impact of the bumper with another vehicle or obstacle.

These and other objects of the invention will more clearly hereinafter appear by reference to the accompanying drawings forming a part of the instant specification and wherein like characters of reference designate corresponding parts throughout the several views, in which.

Figure 1:
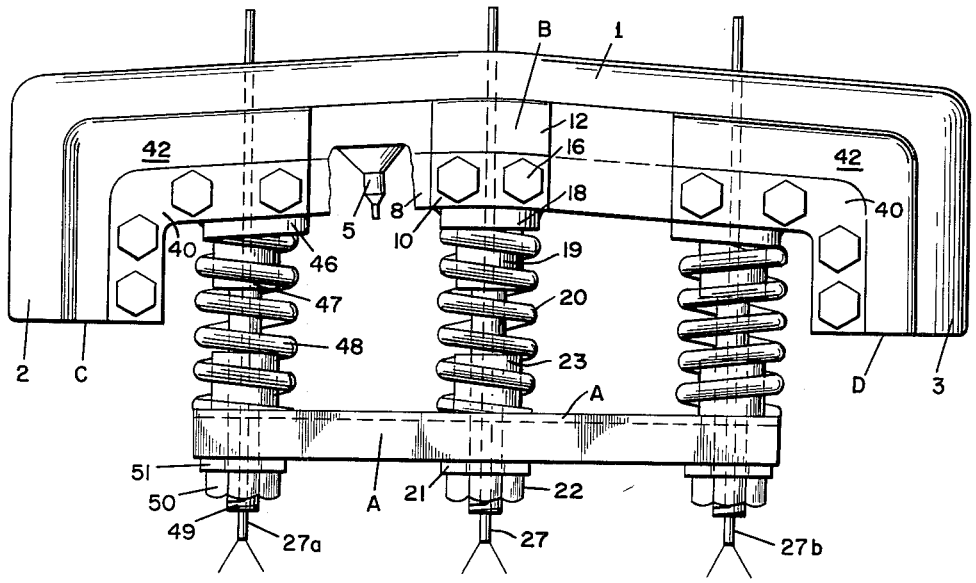
FIG. 1 is a top plan view showing a buffer assembly embodying the present invention.

Referring now to FIG. 1, a channel frame element A of the front or rear portion of a vehicle chassis is illustrated as a mounting element for the buffer assembly. The buffer assembly includes a rubber casing 1 shown in FIG. 1 as having rearwardly projecting terminals 2 and 3 to encompass the end portion of a vehicle and to provide protection against angular impact at these points. The identical shape of the buffer assembly could be modified in accordance with the design and structure of the vehicle upon which it is mounted but should in each instance embody the features shown and described herein.

Figure 3:
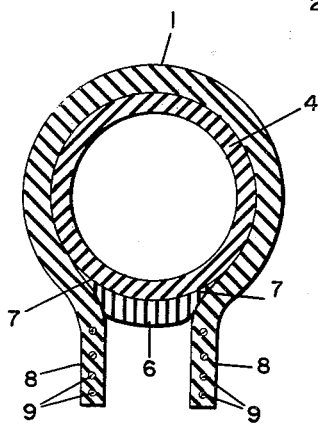
FIG. 3 is a transverse section of the casing and tube.
Figure 5:
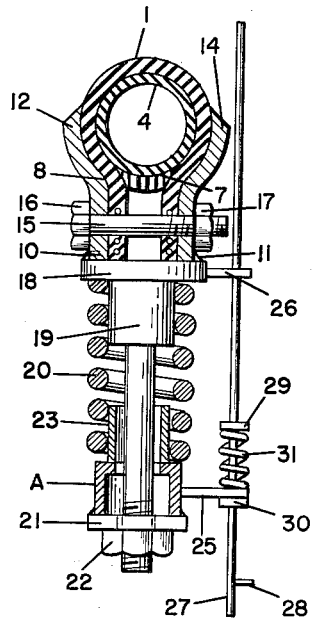
FIG. 5 is a transverse section on line 5—5 of FIG. 2.

The casing 1, 2, 3 is normally inflated by means of a tube 4, shown in FIGS. 3 and 5, this tube being provided with a suitable inflating valve structure 5 for applying and retaining appropriate pressure in the tube 4, which preferably should be in the range of 25 to 30 pounds. A reinforced filler strip or tube support 6 having tapered wings 7 forms a backing for the tube 4 and is positioned at the rear face of the tube with the tapered wings between the tube and the adjacent inner walls of the casing 1. The casing 1, as best shown in FIG. 3, includes an annular body and a pair of parallel rearwardly extending reinforced projections 8 for connection to the mounting means. The projections 8 extend throughout the length of the casing body and are reinforced by a plurality of rods or wires 9.

The pneumatic assembly, including the casing 1 and the inflated tube 4, is mounted on the chassis element A at three spaced points, namely, an intermediate point and at two lateral spaced points or wing portions. The intermediate mount B, shown in FIGS. 1 and 5, comprises a pair of spaced plates 10 which abut the intermediate outer faces of the reinforced casing projections 8 and have outwardly arcuate housing engaging portions 12 and 14 which receive therebetween a substantial portion of the casing to reinforce and back the latter to prevent rupture of the casing wall under excessive impact. The spaced plates 10 and their housing engaging portions 12 and 14 are formed with aligned openings which are aligned with similar openings formed in the projections 8 of the casing and through which bolts 15 extend. The bolts 15 have heads 16 at one end and nuts 17 at the other end for connecting the plates 10 and securing the projections 8 therebetween. The bottom portions of the plates 10 of the mount B are welded as at 11 to the outer face of the enlarged bolt head 18, this enlarged bolt head having a reduced inwardly extending annular portion 19 for receiving one end of a coil spring 20. The spring 20 encircles the annular portion 19 and seats against the inner adjacent face of the enlarged head 18 of the bolt structure.

The bolt structure is elongated and extends through the chassis frame element A to receive the washer 21 and the nut 22 which clamps the parts together and applies necessary compression to the coil spring 20. The chassis frame A is provided with a fixed annular spring guide 23 which receives and retains the inner terminal of the coil spring 20 in position against the frame element A. The annular spring guide 23 is aligned with the annular portion 19 at the outer end of the bolt structure to properly position therebetween the coil spring 20.

The bolt head 18 and the frame element A have lateral projections 25 and 26 formed with aligned openings for the passage of the switch controlled rod 27, the latter projecting slightly beyond the casing 1 at its outer end and including at its inner end an operating projection 28 for actuating a switch, as will be more clearly hereinafter described. The rod includes a pair of stop members 29 and 30 between which is located the spring 31 to retain the rod in a normally projected operating position.

End mounts C and D contain identical components with the intermediate mount but, as will be seen from FIG. 1, are shaped to conform to the end portions of the buffer and to support the terminals of the buffer structure, which as previously indicated might be modified in accordance with the structure of the vehicle to which it is applied.

Figure 2:
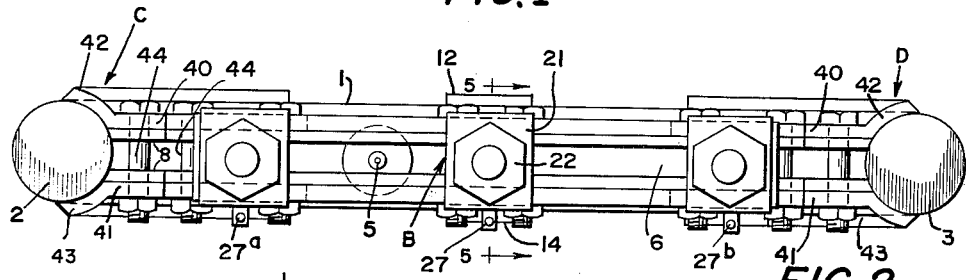
FIG. 2 is a rear elevation of the assembly with the channel frame element removed.

In the present disclosure, and referring particularly to FIGS. 1 and 2, the end mounts embody angular plates, one portion of which encloses the rearwardly extending portions of the buffer assembly and the other portion of which houses the adjacent front portions of the buffer assembly. The casing mounts include the parallel side plates 40 and 41 and arcuate outer projecting portions 42 and 43 which receive approximately one-half of the annular buffer structure. The flat parallel plate portions 40 and 41 are provided with a plurality of openings through which the bolts 44 extend and clamp the parallel wall portions 8 together as heretofore described. Likewise, bolts are provided with enlarged spring backing heads 46 welded to the plates 40 and 41, and annular spring guide portions 47 receive the terminals of the spring 48. The bolts have their shanks 49 threaded to receive nuts 50 which clamp the washers 51 against the face of the chassis section A. As in the instance of the intermediate casing mount, control rods 27a and 27b are mounted for actuation of switches in the control circuits.

Figure 4:
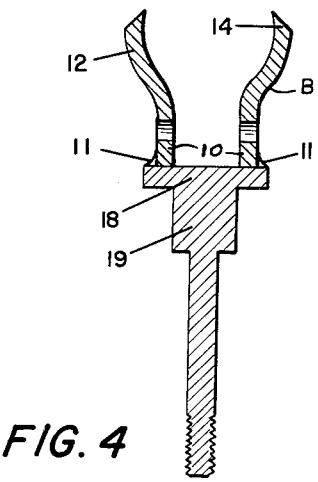
FIG. 4 is an elevation in section of the bolt and housing engaging portions.

Referring now to FIG. 4, the casing mounting structure including the side plates and arcuate housing parts, together with the bolts, form a unitary assembly as will be obvious from the descriptive matter supra. It will also be obvious that by use of the structure described, namely, the three mounting parts B, C, D, an area is provided between these parts to provide for the projection of the inflation valve 5 and for the insertion of the filler strip 6 and the tube 4 so that the initial assembly can be installed and new tubes substituted where a rupture has occurred.

Figure 6:
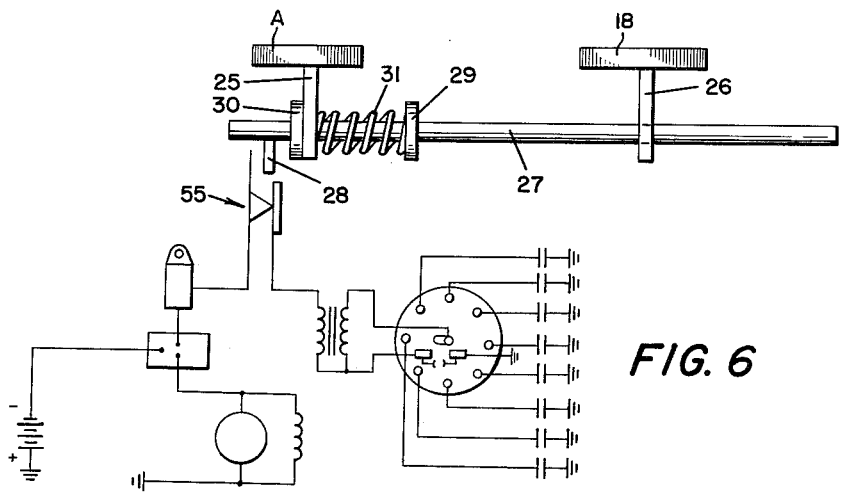
FIG. 6 is a diagrammatic view of a switch controlled rod and its mounting to be used in association with a control circuit for the power plant of the vehicle.

Referring now to FIG. 6, there is illustrated more in detail the use of the switch controlled rods 27 mounted in the brackets 25 and 26 carried respectively by the frame channel member A and the head 18 of the bolt which is welded to the plates 10. In this disclosure it will be obvious that the rod 27 includes a projection 28 which actuates a switch 55 to the motor control circuit. The parts of the motor control circuit are indicated in the drawings but the conventional circuit illustrated forms no part of the instant invention, the invention merely comprehending the use of the impact rods 27 at spaced parts of the assembly for operating the switch 55 by means of which the current to the ignition circuit will control the source of power. When a collision takes place with full force of the accelerated automobiles or other vehicle, that is, velocity multiplied by mass, the release of the power will enable the vehicle to move back after collision. In some instances, if the power is not disengaged, the vehicle will have a tendency to rear up after the collision. Normally the switching arrangement will be provided only to the buffer assembly at the front of the vehicle, although it is intended that each vehicle will be provided with a pair of such devices, namely, one at the front and one at the rear as is now conventional.

The instant invention is believed to be an advance in the art and will materially tend to deaden the shock of a collision and provide minimum possible deformation or damage to the body of colliding vehicles.

What I claim is:

1. In a buffer assembly for a vehicle having a vehicle frame element, an inflatable buffer assembly including an annular outer casing having a pair of flat spaced wall portions, an expansible tube in said buffer assembly including an inflation valve projecting outwardly therefrom, means for connecting the inflatable buffer assembly to the frame element comprising a plurality of bolts, said bolts being arranged in laterally spaced relation and having their ends telescopically mounted on said frame element, the other ends of said bolts being provided with enlarged heads, a pair of casing housing elements rigidly fixed at the opposite outer edge portions of each of said enlarged heads and including laterally projecting arcuate wings for receiving adjacent annular wall portions of said casing and flat wall portions for engagement with the flat spaced wall portions of said outer casing, means extending through said flat wall portions for securing said inflatable buffer assembly in position, and coil springs positioned between said enlarged heads and said frame element to cushion sliding movement of said bolts when said inflatable buffer assembly is under impact.

2. The structure of claim 1 characterized in that a cylindrical guide is fixed to and projects from the enlarged head of each of said bolts and additional cylindrical guides are mounted on the frame element in alignment with the guides mounted on the heads of said bolts for receiving the terminals of the coil springs positioned therebetween.

3. The structure of claim 1 characterized in that the housing elements have slightly mounted thereon switch actuating rods which project outwardly of the buffer element and inwardly of the frame element.

4. In a buffer for a vehicle, said vehicle including a frame element, an inflatable buffer element including an inner tube and an outer casing, said outer casing including a cylindrical portion for housing said tube and a pair of parallel portions formed with bolt openings, bolt members having their ends detachably and telescopically mounted on said frame element, the other end of said bolt being provided with enlarged head portions and annular spring guides, spaced casing housing elements rigidly mounted on the outer face of the enlarged head portions of each bolts, said casing housing elements including arcuate portions and parallel portions for abutting engagement with the parallel portions of said casing, bolt means extending through the parallel portions of said casing housing elements and through the parallel portions of said casing for securing the parts together, said casing housing elements fixed to the enlarged heads of said blots being spaced one from the other to provide therebetween openings for the insertion and removal of the tube in said outer casing, and coil springs mounted on said bolts and positioned between said vehicle frame element and said bolt heads with their end portions encompassing said angular projection to provide spring buffer elements between the inflatable buffer assembly and said frame.

References Cited by the Examiner
UNITED STATES PATENTS

| | | | |
|---|---|---|---|
| 574,656 | 1/97 | Bentley | 293—5 |
| 701,682 | 6/02 | Clark et al. | 293—4 |
| 761,421 | 5/04 | Snyder | 293—42 |
| 981,260 | 1/11 | Harris | 293—89 X |
| 1,446,708 | 2/23 | Kunkel | 293—71 |
| 1,452,427 | 4/23 | Kettlitz | 293—86 |
| 1,471,568 | 10/23 | Olsen | 293—86 |
| 1,552,965 | 9/25 | Smith | 293—71 |
| 1,570,464 | 1/26 | Damore | 180—83 |
| 1,586,339 | 5/26 | Supporter | 293—86 |
| 2,120,459 | 6/38 | Brown | 293—71 |

ARTHUR L. LA POINT, *Primary Examiner.*

LEO QUACKENBUSH, MILTON BUCHLER,
*Examiners.*